United States Patent
Brunson

[19]

[11] Patent Number: 5,806,937
[45] Date of Patent: Sep. 15, 1998

[54] TRAILER BRAKING SYSTEM

[75] Inventor: Thomas L. Brunson, Forsyth, Ga.

[73] Assignee: Trailer Component Innovations, LLC., Forsyth, Ga.

[21] Appl. No.: 655,156

[22] Filed: May 28, 1996

[51] Int. Cl.⁶ .................................................. B60T 7/20
[52] U.S. Cl. ................................................ 303/7; 188/3 H
[58] Field of Search ................................... 188/3 H, 3 R, 188/112 R, 138, 156, 161, 164, 168, 170, 171, 182; 303/3, 7, 9, 10, 15, 20; 60/594

[56] References Cited

U.S. PATENT DOCUMENTS

| | | | |
|---|---|---|---|
| 2,127,890 | 8/1938 | Sills et al. | 188/356 |
| 2,142,514 | 1/1939 | Jones | 188/356 |
| 2,248,435 | 7/1941 | Pleiues | 188/355 |
| 2,940,561 | 6/1960 | Atkiu | 188/3 R |
| 2,941,844 | 6/1960 | Stelzer | 188/3 R |
| 3,171,694 | 3/1965 | Sisson | 303/7 |
| 3,695,731 | 10/1972 | England et al. | 303/7 |
| 3,756,666 | 9/1973 | Leiber | 303/10 |
| 3,768,870 | 10/1973 | Howard | 303/7 |
| 3,834,767 | 9/1974 | Bullinger | 303/7 |
| 3,880,472 | 4/1975 | Lewis et al. | 303/7 |
| 3,951,464 | 4/1976 | Donahue et al. | 303/7 |
| 3,985,395 | 10/1976 | Watanabe | 303/7 |
| 3,995,911 | 12/1976 | Kasselwann et al. | 303/7 |
| 4,054,325 | 10/1977 | Porp | 303/7 |
| 4,099,790 | 7/1978 | Hipps | 303/7 |
| 4,280,737 | 7/1981 | Hipps | 303/3 |
| 4,402,553 | 9/1983 | Hipps | 303/3 |
| 4,787,205 | 11/1988 | Foutaine | 188/356 |
| 5,213,396 | 5/1993 | Avery et al. | 303/7 |
| 5,382,085 | 1/1995 | Zbinden | 303/7 |
| 5,626,402 | 5/1997 | Saffiau | 30/7 |

Primary Examiner—Robert J. Oberleitner
Assistant Examiner—Chris Schwartz
Attorney, Agent, or Firm—Sand & Sebolt

[57] ABSTRACT

A trailer braking system for applying hydraulic brake pressure to a trailer includes a master brake cylinder mounted to a flange body carried by the trailer frame. The master cylinder is hydraulically connected to the trailer brakes as well as to a feedback control cylinder. An electronic brake controller is electronically connected to an electromagnet positioned adjacent to, but spaced apart from an iron bar carried by a control system lever. When the electronic brake controller forwards a signal to the electromagnet, it is energized and attracts the iron bar thereby moving the control system lever toward an energized stop. Movement of this control system lever forwards a signal to a control valve which exhausts air from an air spring. As air is exhausted from the air spring, an actuator lever and an interconnected actuator rod are moved toward the master cylinder. Movement of the actuator rod applies brake pressure to the trailer brakes, and also supplies pressure to the feedback control cylinder. After a predetermined pressure has been reached in the feedback control cylinder, an actuator button 96 is forced upward thereby moving the iron bar away from the electromagnet. When trailer braking pressure is no longer required, the control valve inflates the air spring via air from an air compressor filled air reservoir. In an alternate embodiment, the air spring is inflated to apply brake pressure and exhausts when trailer brake pressure is no longer required.

23 Claims, 6 Drawing Sheets

TRAILER BRAKING SYSTEM

BACKGROUND OF THE INVENTION

1. Technical Field

The invention relates generally to trailer braking systems. More particularly, the invention relates to electronically controlled trailer braking systems. Specifically, the invention relates to hydraulic brake systems on trailer vehicles mechanically and electronically connected to a tow vehicle.

2. Background Information

Trailers have been used for a number of years to increase the load carrying capacity of a vehicle when moving from one point to another. Such trailers come in a variety of sizes and configurations, including large trailers which form the rear portion of the combination commonly referred to as a tractor-trailer combination. Such trailers are universally provided with air operated brake systems as the same are extremely reliable, and are capable of stopping relatively large loads along relatively small distances. As a result, tractor vehicles are also commonly supplied with air brakes, and standard pig tail connections are utilized to attach the air brakes of the tractor vehicle to the air brakes of the trailer vehicle.

Conversely, smaller trucks, such as standard pickup trucks, are generally supplied with hydraulic brakes, and do not include air supply systems. Inasmuch as such trucks are virtually never equipped with air brake systems, the trailer also cannot be equipped with air brakes powered by the truck brake system, and in any event this would necessitate the inconvenience of making pig tail air hose connections to the trailer. Electric trailer brakes, powered by the truck electric system and controlled from the truck cab, are sometimes used, but seldom have the braking capacity required for the extremely heavy trailer loads which are all too common. Hydraulic trailer brakes could be used as most smaller trucks of this type are equipped with hydraulic brakes, but these hydraulic systems do not have sufficient fluid capacity or delivery rates to operate the trailer as well as the truck brakes, even if a pig tail hydraulic hose connection to the trailer were provided.

A number of trailer braking systems have been utilized to overcome the above referenced problem, which systems are presumably adequate for the purpose for which they are intended. However, each of the prior art trailer braking systems present additional problems in that they are either expensive to install, slow to operate or unreliable.

The first known braking systems for trailers is widely used, and is an electric type braking system. These systems conventionally include electromagnets mounted inside the brake drum of each wheel of the trailer; which, upon application of electric current, attach themselves to an armature plate mounted inside the brake drum. The rotating motion of the wheel then carries the attached electromagnet with it causing an armature attached to the electromagnet to rotate and expand braking bands against the brake drum. Electric current is supplied via a rheostat activated by hydraulic pressure from the brakes of the towing vehicle or by a hand control mounted in the passenger compartment of the towing vehicle. The disadvantages of such a system include the fact that during normal operation, braking pressure is supplied first to the hydraulic brakes of the towing vehicle and then, as the electric brake of the towed vehicle is activated, a noticeable lurch occurs which may affect the control of the towing vehicle during braking. Further, variance in electromagnetic strength among the electromagnets in each wheel may cause uneven braking and further control problems. Such a system is also prone to electrical wiring problems because electrical wires carrying current to each electromagnet are exposed between the wheel and the trailer frame. Finally, while such electrical braking systems are often supplied with an emergency brake-away kit which includes a non-rechargeable dry cell battery to automatically complete the circuit to the electromagnet upon physical separation of the towing vehicle and the trailer, these brake-away systems are completely dependent on the performance of the dry cell batteries which may, over a period of time, lack sufficient charge to properly activate the electric brakes.

A second type of conventional braking system used in conjunction with trailers are surge hydraulic brakes. While surge brake systems have relatively low maintenance and may be used on a variety of trailer configurations, a number of problems are associated with these systems. Surge systems typically include a piston and cylinder mounted between the trailer and the towing vehicle. When the brakes of the towing vehicle are applied, the momentum of the trailer causes the piston to move into the cylinder resulting in hydraulic pressure which is transferred to the hydraulic brake cylinders of the trailer. The disadvantage of this system includes the apparent fact that in case of brake failure in the towing vehicle, no trailer brake pressure is applied. Further, there is no provision for hand activation of such a system thus making this type of system illegal under the relevant laws of many states. It is also apparent from the foregoing brief description of the conventional surge hydraulic brake system, full braking power is applied to the trailer when the towing vehicle is operated in a reverse gear, whether or not such braking is desired. Still further, difficulties arise in that the piston cylinder arrangement takes a significant amount of time to accurately mount between the trailer and towing vehicle. It is the piston cylinder arrangement that causes problems with surge hydraulic braking systems, as the hydraulic portion of the brake system is well received.

The third type of conventional braking systems is a standard hydraulic system where the trailer is affixed with hydraulic brakes, and a pigtail connection exists between the hydraulic brake line from the towing vehicle to the trailer. While this system is extremely reliable, the use of a hydraulic pigtail connection is cumbersome, and a significantly larger brake pump, and additional brake lines must be added to the towing vehicle substantially increasing installation costs of this type of trailer braking system.

The fourth type of conventional braking system is the vacuum brake system. This type of system conventionally includes a vacuum chamber, containing a diaphragm mounted to the tow vehicle to which vacuum is supplied from the intake manifold of the towing vehicle. Upon activation of this type of braking system, atmospheric pressure is allowed to enter one side of the vacuum chamber, thus causing the diaphragm to expand into the evacuated side of the chamber, thereby mechanically moving a rod attached to the diaphragm which advances a piston in the master cylinder and creates hydraulic pressure to the hydraulic brakes of the trailer. Release of the braking pressure is accomplished by reestablishing a vacuum on both sides of the diaphragm within the vacuum chamber. The disadvantages of such a system include the necessity of leak-proof vacuum lines to the vacuum source, usually the engine of the towing vehicle, and the fact that the operation of such a system is relatively slow causing a time difference between the application of the brakes of the towing vehicle and those of the trailer. As is also apparent, complete loss of the trailer brakes will occur in the event of engine failure or a separation or leak in the vacuum lines leading to the trailer.

Therefore, the need exists for an improved trailer braking system which utilizes hydraulic fluid, and which may be conveniently controlled from an existing electronic controller, and which is easy to install, and simple to couple to the towing vehicle.

SUMMARY OF THE INVENTION

Objectives of the invention include providing a trailer brake system controlled from the towing vehicle.

Another objective is to provide a trailer braking system controlled either by known electronic brake controllers, or by depression of the tow vehicle brake pedal.

A further objective is to provide a trailer braking system which includes a fail safe brake-away system, which requires no dry cell battery.

A still further objective is to provide a trailer braking system which utilizes hydraulic fluid when applying the trailer brakes.

Yet another objective is to provide a trailer braking system which is relatively easy and inexpensive to install.

A still further objective is to provide a trailer braking system which may be used with both drum and disc brakes.

Yet another objective is to provide a trailer braking system which requires little alteration to the towing vehicle.

A still further objective is to provide a trailer braking system which operates simultaneously with, or very soon after the towing vehicle brakes operate.

Another objective is to provide a trailer braking system which is of simple construction, which achieves the stated objectives in a simple, effective and inexpensive manner, and which solves problems and satisfies needs existing in the art.

These and other objectives and advantages of the invention are obtained by the improved trailer braking system, the general nature of which may be stated as including a brake cylinder carried by the trailer; actuator rod operatively engaging the brake cylinder; a hydraulic brake shoe adapted to be mounted on at least one wheel; a hydraulic brake line extending between the hydraulic brake and the brake cylinder; spring means for moving the actuator rod relative to the brake cylinder; actuator means for overcoming the spring means and moving the actuator rod in a direction opposite the direction of movement of the actuator rod as a result of the spring means; and electric control means for controlling the actuator means from the towed vehicle whereby the electric control means controls the actuator means to move the actuator rod toward the brake cylinder and for increasing the hydraulic pressure within the hydraulic line and for applying the hydraulic brakes carried by the trailer.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
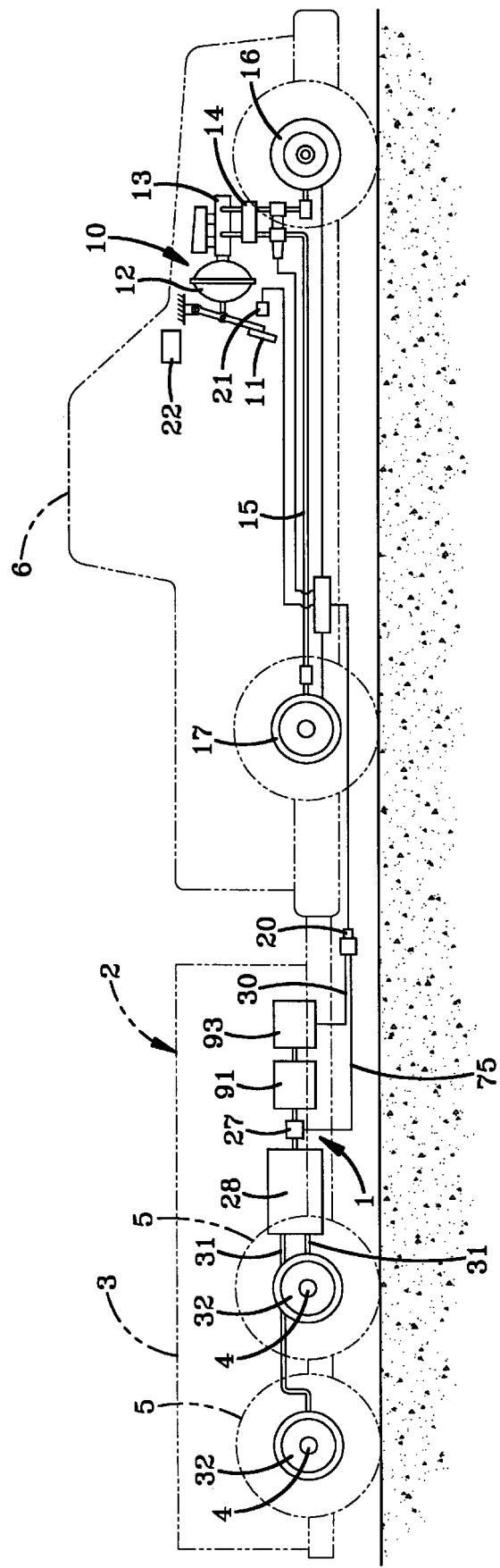
FIG. 1 is a diagrammatic side elevational view of a towing vehicle and trailer brake system with the towing vehicle and trailer shown in dot-dash lines.

The improved braking system of the present invention is indicated generally at 1, and is particularly shown in FIG. 1 mounted on a trailer 2. Trailer 2 includes a cargo box 3 supported by a pair of axles 4 having a tire wheel assembly 5 mounted on each end thereof. Axles 4 are carried by a frame 7. While trailer 2 is shown in FIG. 1 as a standard utility trailer, it may take a variety of sizes and configurations including a flat trailer or horse trailer, and may be supported by any number of axles 4 without departing from the spirit of the present invention.

Trailer 2 is coupled to a tow vehicle 6 which may also take a variety of sizes and configurations and as shown as a usual pickup truck in the preferred embodiment.

Tow vehicle 6 is supplied with a hydraulic braking system 10 which includes a brake pedal 11 operatively connected to a power booster 12. Power booster 12 is connected to a master cylinder 13 and a modulator 14 for increasing and decreasing the pressure within hydraulic brake system 10. Hydraulic brake fluid exits modulator 14 and enters hydraulic brake lines 15 which extend to front disc brake 16 and rear drum brake 17. While disc brake 16 and drum brake 17 may take a variety of sizes and configurations, it is generally known that vehicles include either disc brake 16 or drum brake 17 on both the front and rear tire wheel assemblies. An electronic plug 20 is positioned adjacent the rear of the vehicle and is in electronic communication with hydraulic brake system 10. A control switch 21 is positioned adjacent brake pedal 11 for operating the brake lights of tow vehicle 6 and is wired to braking system 1 to selectively apply the brakes to trailer 2. Alternately, control switch 21 may be wired to an electronic brake control 22 mounted within the cab of tow vehicle 6 which electronic brake controller has a manually operable control knob utilized to operate the towed vehicle brake system, and which is wired directly to coupling 20 to manually increase and decrease the brake pressure on braking system 1 of trailer 2. While there are a variety of types of sizes and configurations of electronic brake controllers, the Tekonsha Engineering Company of 537 North Church St., Tekonsha, Mi. 49092 offers one controller under the trademark COMMANDER, and is sold under Model No. 9010. Still further, an electronic brake control 22 may operate braking system 1 separately from switch 21.

The braking system of the towed vehicle may thus be operated via closure of a control switch 21 positioned adjacent the brake pedal or manual operation of the control knob on an electronic brake controller 22 mounted to the dash of tow vehicle 6 or by an electronic brake control that is not wired to switch 21.

Electronic brake controller 22 is utilized to operate braking system 1 which is a hydraulic braking system and includes an air compressor 93, an air reservoir 91, a brake control system 27 and an actuator system 28. Brake control system 27 and air compressor 93 are electronically connected to coupling 20 via wires 75 and 30 respectively. Actuator system 28 is connected via hydraulic lines 31 to wheel brakes 32.

Figure 2:
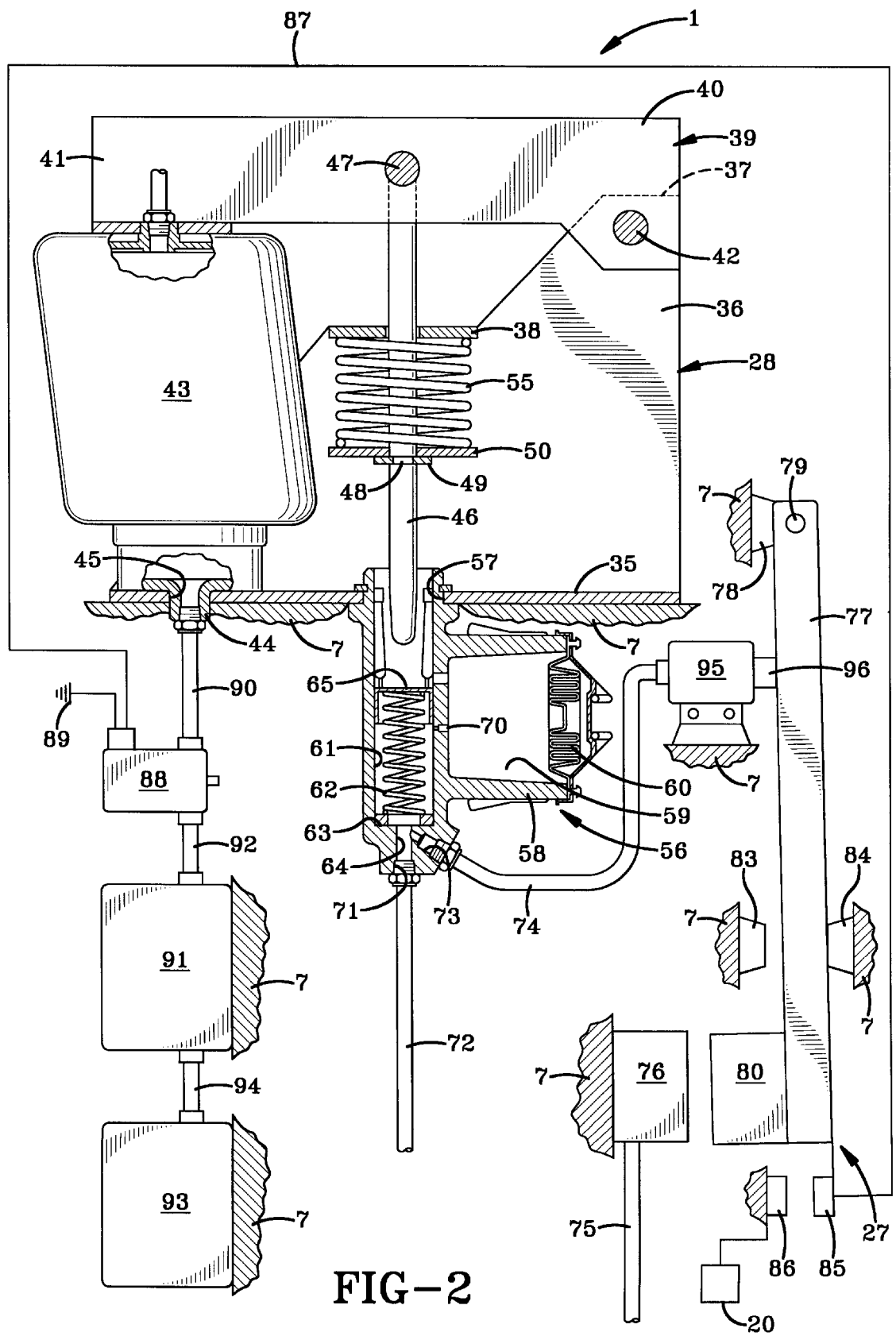
FIG. 2 is a partial diagrammatic view of the brake control system and brake actuator system of the first embodiment of the invention with portions of the actuator system shown in section and with the brake control system and brake actuator system shown in a first position.

Referring to FIG. 2, air compressor 93, air reservoir 91, brake control system 27 and actuator system 28 are shown in detail. Actuator system 28 includes a flange 35 extending outwardly from frame 7 of trailer 2. A flange body 36 extends outwardly from plate 35 and includes an ear portion 37 and a plate portion 38. In accordance with one of the main features of the present invention, an actuator lever 39 having a first end 40 and a second end 41 is mounted to ear portion 37 via a pivot pin 42. An air spring 43 is mounted intermediate second end 41 of actuator lever 39 and plate 35. Air spring 43 includes a bushing 44 which extends through a hole 45 formed through plate 35 for purposes which will be described in detail hereinbelow. Alternatively, an air cylinder (not shown) may be utilized in place of air spring 43 without departing from the spirit of the present invention.

In accordance with another feature of the present invention, an actuator rod 46 is mounted to actuator lever 39 via a mounting pin 47. Actuator rod 46 includes a recessed keyway 48 sized to receive an outwardly extending flange 49. A force plate 50 is positioned against flange 49, and is parallel and spaced apart from plate portion 38 of flange body 36. A coil spring 55 is positioned intermediate plate portion 38 and force plate 50 and beside air spring 43.

A master brake cylinder 56 extends through a hole 57 formed in plate 35 and is securely mounted thereto. Brake cylinder 56 includes a body 58 having a reservoir 59 for receiving hydraulic fluid. Reservoir 59 is sealed with an expandable baffle seal 60. Body 58 is also formed with a cylinder 61 having a coil spring 62 mounted therein. One end of coil spring 62 abuts against an end 63 of cylinder 61 having a hole 64 extending therethrough. The opposite end of coil spring 62 is positioned within a cylinder cap 65 slidably mounted within cylinder 61. Cylinder 61 extends through hole 57 formed in plate 35 with the free end of actuator rod 46 extending therethrough whereby actuator rod 46 is movable into abutting engagement with cylinder cap 65.

Master brake cylinder 56 includes an opening 70 for allowing brake fluid to pass from reservoir 59 into cylinder 56. Additionally, hole 64 includes a first opening 71 connected to a brake line 72 for transmitting brake fluid to the brake assemblies at the respective tire-wheel assemblies 5 on trailer 2. Similarly, hole 64 includes a second opening 73 operatively communicating with a feedback line 74.

Having now described actuator system 28, brake control system 27 is attached to electric brake controller 22 on tow vehicle 6 via wire 75. Wire 75 is operatively connected to an electromagnet 76 mounted to frame 7 of trailer 2.

A control system lever 77 is mounted to a base 78 via a pivot pin 79 and has an iron bar 80 mounted to its end opposite pivot pin 79. An energized stop 83 is positioned on one side of control system lever 77 and a control stop 84 is positioned on the other side of control system lever 77 whereby stops 83 and 84 are spaced apart a distance greater than the width of control system lever 77. A contact plate 85 extends outwardly from the movable end of control system lever 77 and is positioned to move into and out of contact with stationary plate 86 and when shown in the position of FIG. 2, contact plates 85 and stationary plate 86 are spaced apart a distance equal to the distance between energized stop 83 and control system lever 77. Control system lever 77 is electronically connected via a wire 87 to a control valve 88. While control valve 88 may have a variety of configurations, in the preferred embodiment it is a three-way 12 volt direct current solenoid valve. Control valve 88 is grounded at ground 89 and is attached to air spring 43 via an air hose 90. Air reservoir tank 91 is attached to control valve 88 via an air hose 92. Similarly, compressor 93 is attached to air reservoir 91 via an air hose 94.

A feedback control cylinder 95 is mounted to frame 7 and is connected to feedback line 74. Feedback control cylinder 95 includes an actuator button 96 in abutting engagement with control system lever 77. Feedback control cylinder 95 is shown intermediate base 78 and energized stop 83. However, feedback control cylinder 95 could be positioned anywhere along the length of control system lever 77 without departing from the spirit of the present invention. For example, lever 77 could pivot about a pivot point 79 positioned intermediate contacts 76 and 80 and feedback control cylinder 95.

In operation, brake pedal 11 of tow vehicle 6 is depressed and electronic brake controller 22 generates an output signal proportional to tow vehicle deceleration. The signal is forwarded through wire 75 and energizes electromagnet 76. Energized electromagnet 76 then magnetically attracts iron bar 80 mounted on control system lever 77 and pulls control system lever 77 toward energized stop 83 mounted on frame 7 of trailer 2. When control system lever 77 is in abutting contact with energized stop 83, actuator button 96 of feedback control cylinder 95 is depressed, as shown specifically in FIG. 3. The movement of control system lever 77 causes contact plate 85 to move into abutting engagement with stationary plate 86 sending current through wire 87 to energize control valve 88. When control valve 88 is energized, supply air from air reservoir 91 is blocked, and air is exhausted from air spring 43. As air is exhausted from air spring 43, actuator lever 39 begins to rotate about pivot pin 42. Rotation of actuator lever 39 toward plate 35 causes interconnected actuator rod 46 to move into master brake cylinder 56. Specifically, as air is exhausted from air spring 43, coil spring 55 is permitted to expand against plate portion 38 of flange body 36. Coil spring 55 thus pushes off of plate portion 38 and applies pressure to force plate 50 connected to actuator rod 46. This force thus assures that actuator rod 46 will move into master brake cylinder 56 as air is exhausted from air spring 43 to the position shown in FIG. 2. Movement of actuator rod 46 into cylinder 61 of master brake cylinder 56 will occur until actuator rod 46 contacts cylinder cap 65.

As air continues to exhaust from air spring 43, coil spring 55 continues to exert a force upon force plate 50 and actuator rod 46 continues to move into cylinder 61 of master brake cylinder 56 thereby overcoming coil spring 62 and forcing hydraulic fluid into brake line 72 and feedback line 74. Pressure within brake line 72 begins to increase as a result of the interaction between actuator rod 46 and cylinder cap 65 and the trailer begins to decelerate. Similarly, feedback line 74 receives pressure similar to that received by brake line 72 and when the pressure within feedback line 74 reaches a predetermined level, feedback control cylinder 95 is actuated and actuator button 96 is moved upwardly from the position shown in FIG. 3 to the position shown in FIG.

2. Actuator button 96 thus pushes control system lever 77 against control stop 84 and moves contact plate 85 out of contact with stationary plate 86 which stops the current being forwarded through line 87 to control valve 88. Control valve 88 thus discontinues the exhaustion of air from air spring 43 and equilibrium is reached in braking system 1.

When control valve 88 is returned to its deenergized condition, air from air reservoir 91 passes through air hose 92 and into air spring 43. As air spring 43 expands, the force exerted by air spring 43 on actuator lever 39 overcomes the force of coil spring 55. The continued expansion of air spring 43 thus compresses coil spring 55 and removes actuator rod 46 from cylinder 61 of master brake cylinder 56. As actuator rod 46 removes from cylinder 61, coil spring 62 is permitted to expand, and reduce the hydraulic pressure in brake line 72 and feedback line 74 and braking force on trailer 2 is decreased. As the brake hydraulic pressure continues to decrease, the force on feedback control cylinder 95 also decreases until actuator button 96 collapses into feedback control cylinder 95. The braking signal will again be received through wire 75, and the electromagnet will reenergize, and pull control system lever 77 once again from the position shown in FIG. 2 to the position shown in FIG. 3, or from the control stop towards the energized stop and the braking system cycles as described above.

During use, it is common for the operator of tow vehicle 6 to require varying levels of brake control. The user will apply larger brake pressure on brake pedal 11 when the user wishes to stop quickly, for example during emergency deceleration. Alternatively, the user may wish to apply light brake pressure, for example when slowing on a highway to permit oncoming traffic to merge.

Thus, another feature of the present invention permits variable brake pressure in braking system 1 of trailer 2 similar to the variable brake pressure applied to the hydraulic brake system of tow vehicle 6. Specifically, as foot pressure is increased on brake pedal 11, the rate of deceleration of tow vehicle 6 increase and brake controller 22 increases the output signal forwarded to line 75, the attractive force generated by electromagnet 76 also increases which results in increased hydraulic brake pressure acting in a trailer brake system. As the attraction between electromagnet 76 and iron bar 80 increases, the force necessary for feedback control cylinder 95 to deactivate control system lever 77 also increase.

Similarly, when the rate of deceleration of tow vehicle 6 is decreased by the user reducing the foot pressure on brake pedal 11, electric brake controller 22 will forward a smaller signal along line 75 thereby reducing the attractive force between electromagnet 75 and iron bar 80 producing a smaller hydraulic brake force acting on trailer 2. When the deceleration of tow vehicle 6 is reduced to zero and the user's foot is entirely removed from brake pedal 11, electric brake controller 22 does not generate an output and no attractive force exists between electromagnet 76 and iron bar 80 thereby permitting control system lever 77 to move toward control stop 84 via the actuation of feedback control cylinder 95 and control button 96. The movement of control system lever 77 thus causes contact plate 85 and stationary plate 86 to break contact and close control valve 88. When control valve 88 closes, air pressure, generated by air compressor 93 is forwarded through air hose 94 and into air reservoir 91 which in turn empties through air hoses 92 and 90 and inflates air spring 43.

Figure 3:
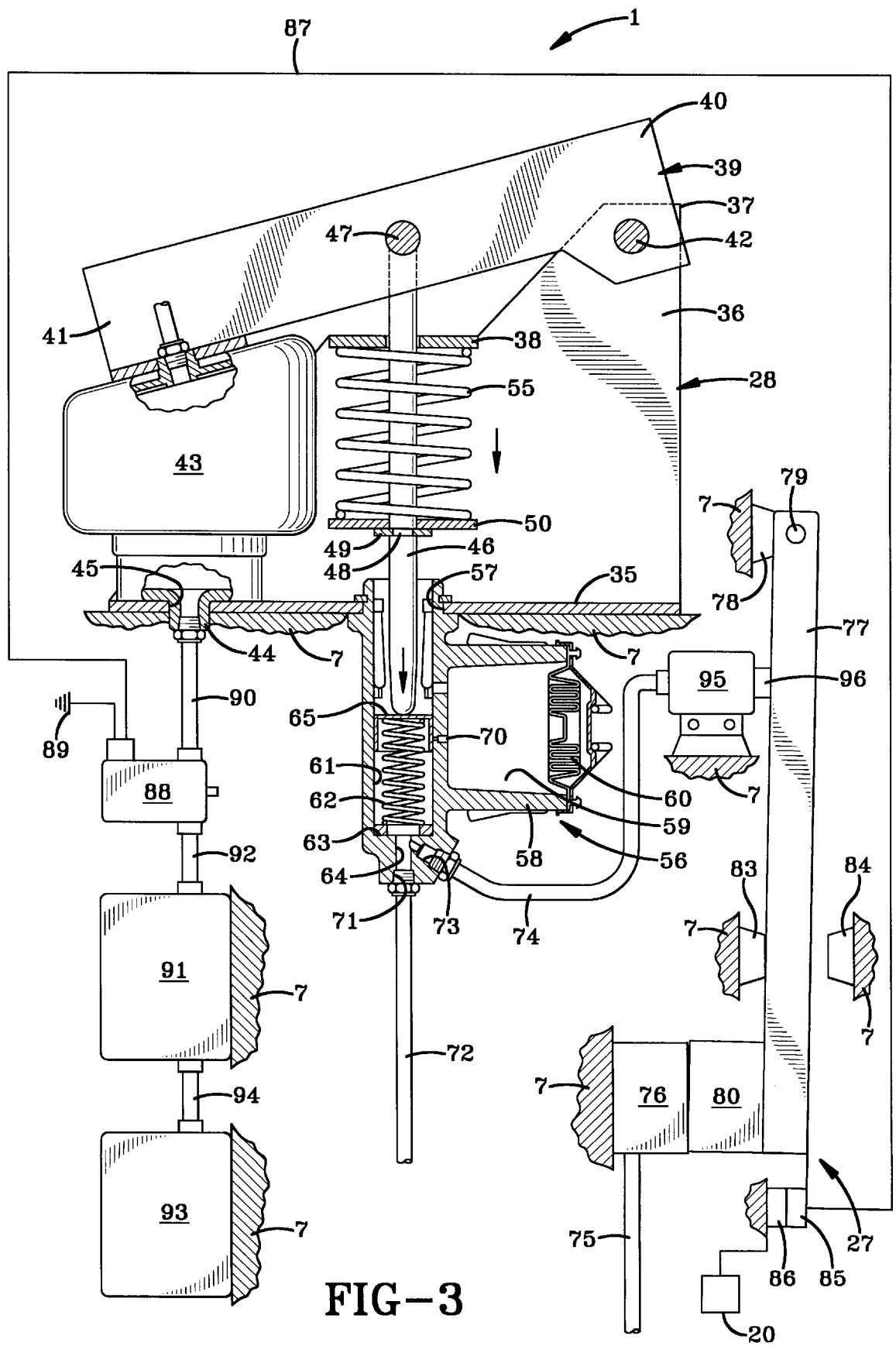
FIG. 3 is a partial diagrammatic view similar to FIG. 2 with the brake control system and brake actuator system shown in a second position.

In accordance with another feature of the invention, braking system 1 is break-away safe. Specifically, if trailer 2 should mechanically decouple from tow vehicle 6, or air pressure should be lost in the system, or even if the control wire extending from tow vehicle 6 to trailer 2 should be disconnected, control valve 88 will automatically exhaust air from air spring 43. As air is exhausted from air spring 43, actuator lever 39 and interconnected actuator rod 46 will move toward plate 35 under the pressure of coil spring 55. The movement of actuator rod 46 into cylinder 61 will apply hydraulic brake pressure to trailer 2 as shown in FIG. 3.

Figure 4:
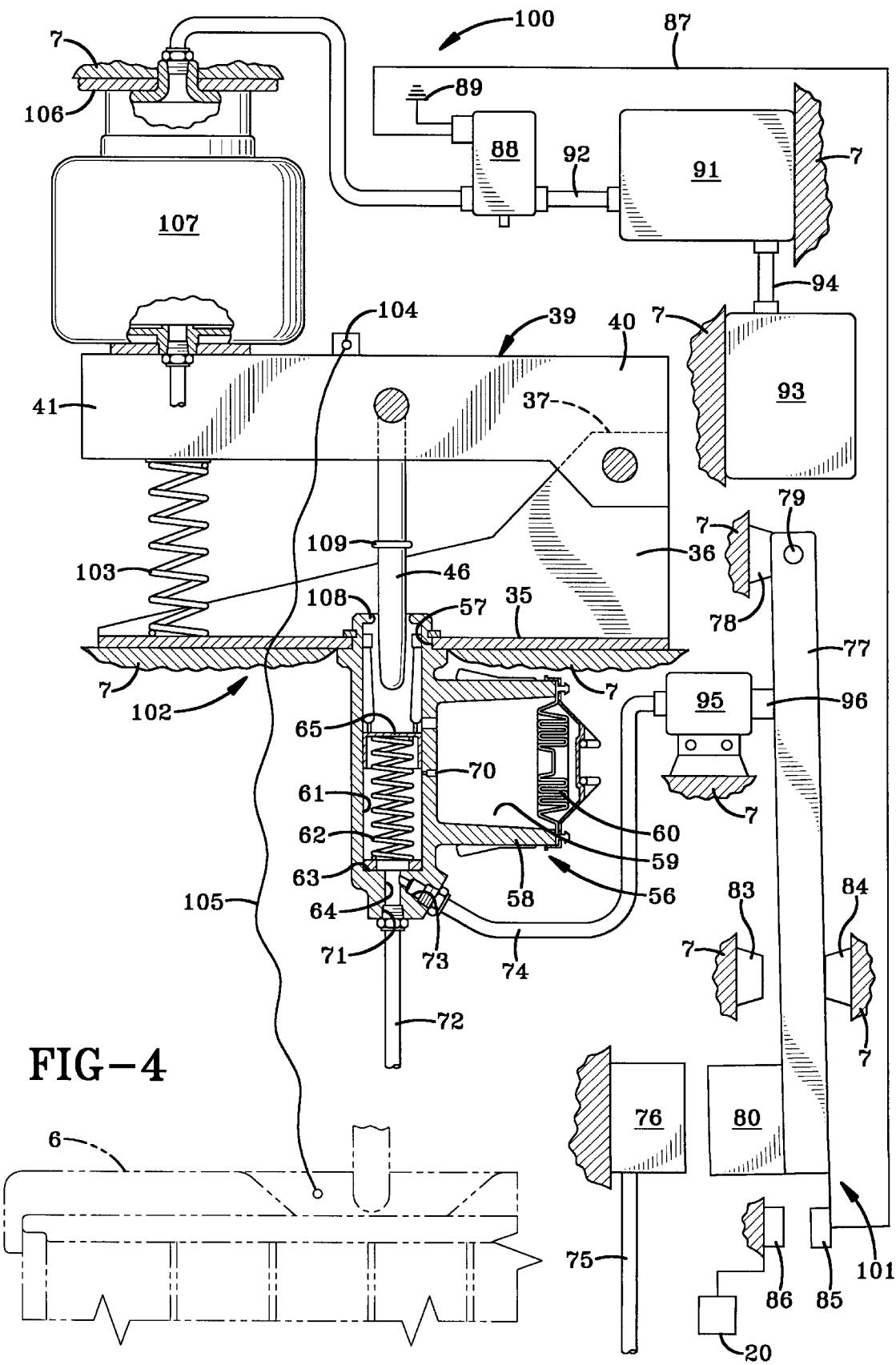
FIG. 4 is a partial diagrammatic view of the brake control system and brake actuator system of a second embodiment of the invention with portions of the brake actuator system shown in section, and with the tow vehicle shown in dot-dash line and with the brake control system and brake actuator system shown in a first position.
Figure 5:
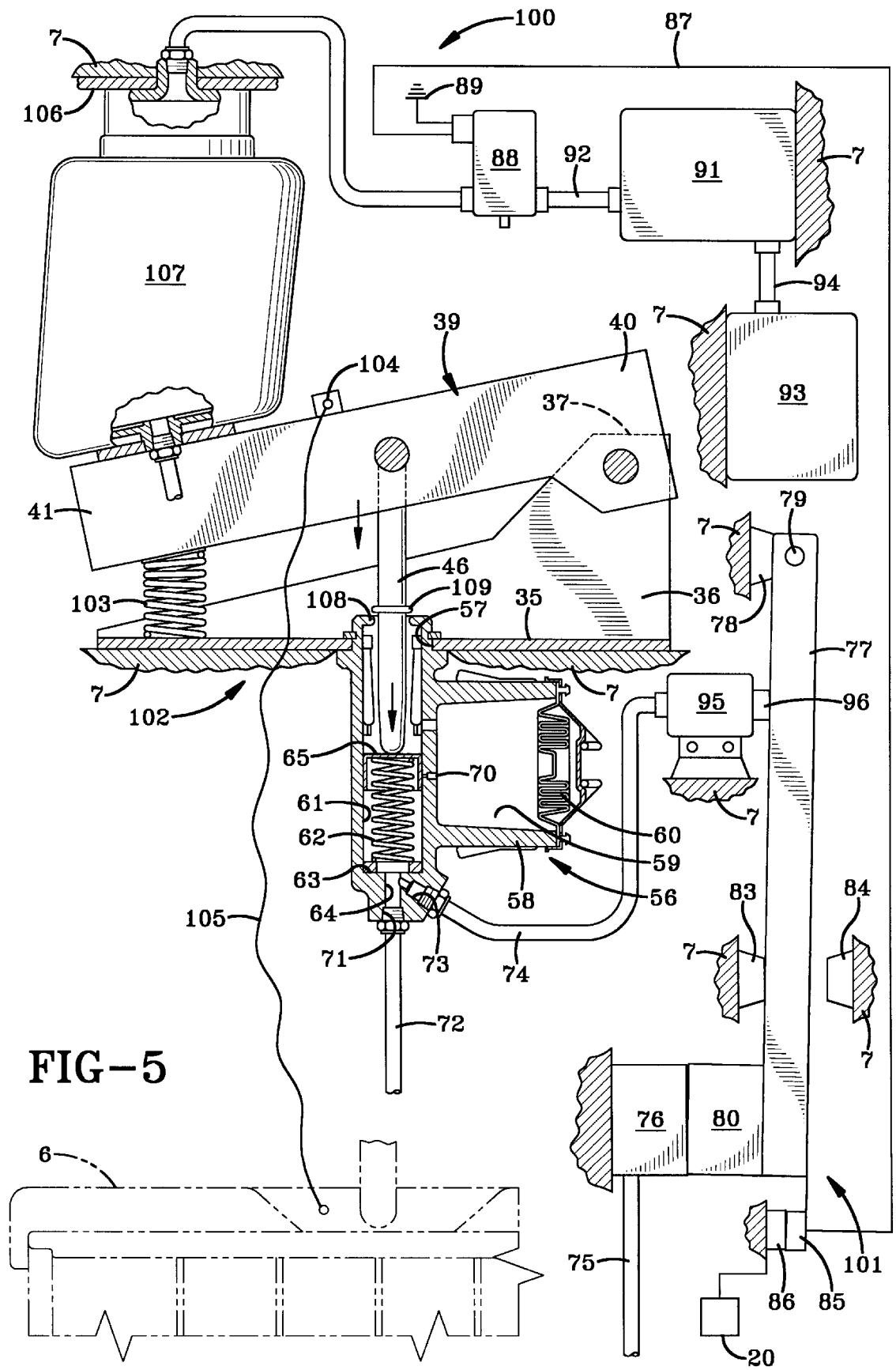
FIG. 5 is a partial diagrammatic view of the brake control system and the brake actuator system shown in a second position.
Figure 6:
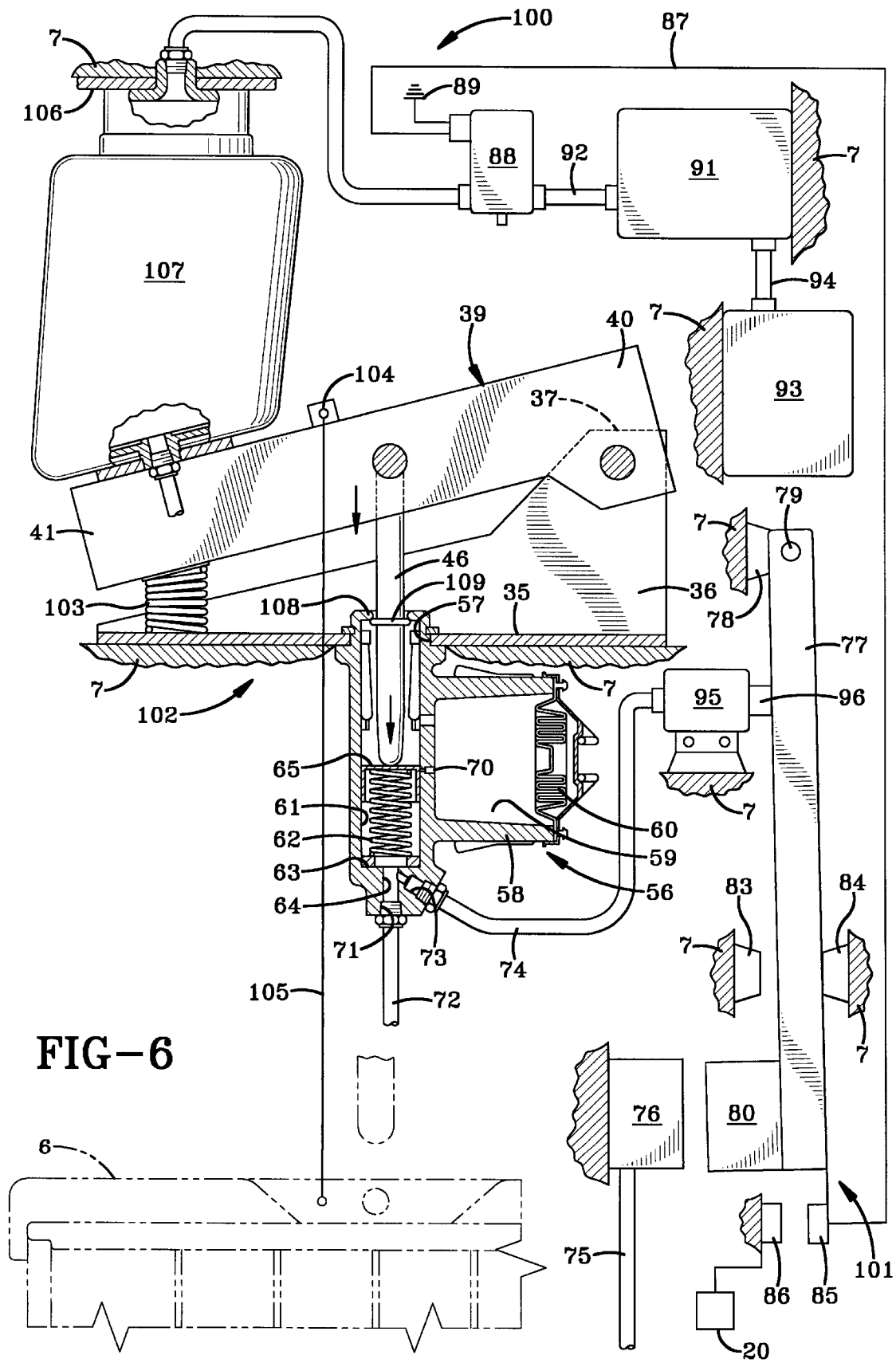
FIG. 6 is a partial diagrammatic view of the brake control system and brake actuator system as shown in FIG. 5 with the emergency brake away system engaged.

A second embodiment of the present invention is indicated generally at 100 and is shown particularly in FIGS. 4–6. Braking system 100 is similar to braking system 1 in that it includes a brake control system 101 and an actuator system 102. Actuator system 101 includes a master cylinder 56, a flange body 36 having a plate 35, an actuator lever 39 and a actuator rod 46.

Similarly, brake control system 101 is similar to brake control system 27 in that it includes a line 75, an electromagnet 76, a control system lever 77, energized stop 83 and control stop 84, a compressor 93, an air reservoir 91 and a control valve 88. Braking system 100 differs from braking system 1 in that a coil spring 103 similar to coil spring 62 is positioned intermediate plate 35 and actuator lever 39 and is spaced apart from actuator rod 46. Additionally, a mounting tab 104 is carried by actuator lever 39 and a safety chain 105 extends from tab 104 to tow vehicle 6. Additionally, frame 7 of trailer 2 is formed with a pressure plate 106 and an air spring 107 is mounted intermediate pressure plate 106 and actuator lever 39. As is apparent from a review of FIG. 4, the inflation of air spring 107 will compress coil spring 103 and the deflation of air spring 107 will permit coil spring 103 to expand.

Operationally, air spring 107 is normally deflated when no brake pressure is applied to brake pedal 11 of tow vehicle 6 as shown specifically in FIG. 4. However, when the user applies pressure onto brake pedal 11 to decelerate tow vehicle 6, electric brake controller 22 forwards a signal along line 75 to energize electromagnet 76 which in turn attracts iron bar 80 and moves control system lever 77 from a position adjacent the control stop to a position adjacent the energized stop. The movement of control system lever 77 thus causes contact plate 85 to move into contact with stationary plate 76 and forward a signal to control valve 88. Upon receipt of the signal, control valve 88 moves from the open position which exhausts air from air spring 107 to the closed position to permit air to travel through control valve 88 and into air spring 107. As air enters air spring 107, it expands from the position shown in FIG. 4 to the position shown in FIG. 5 and compresses coil spring 103. As coil spring 103 compresses, actuator lever 39 and interconnected actuator rod 46 move toward plate 35 and apply hydraulic brake pressure in the manner described hereinabove. Essentially, the primary difference between braking system 1 and braking system 100 is that in braking system 1, control valve 88 exhausts air from air spring 43 to apply braking pressure, and alternatively, control valve 88 of braking system 100 inflates air spring 107 to apply braking pressure to trailer 2.

As air spring 107 is in the collapsed position when no brake pressure is to be applied, a separate break away mechanism is provided. In the event that trailer 2 would mechanically decouple from tow vehicle 6 as shown specifically in FIG. 6, safety chain 105 attached to tab 104 carried by actuator lever 39 would be pulled tight, as shown specifically in FIG. 6. As safety chain 105 is pulled tight, it will apply sufficient pressure to coil spring 103 to compress the same. As coil spring 103 is compressed, actuator lever 39 and interconnected actuator rod 46 will be moved toward plate 35 with actuator rod 46 being moved into cylinder 61 of master braking cylinder 56. As actuator rod 46 is moved into cylinder 61, flange 109 will also be forced into cylinder 61 and will be retained therein intermediate a pair of fingers 108. Safety chain 105 is designed to withstand tensile force sufficient to overcome the bias of coil spring 103, and then to break away soon thereafter in order to assure that trailer 2 will not be pulled by tow vehicle 6 via safety chain 105.

Braking system 1 and braking system 100 provide a hydraulic trailer braking system which is controlled via an electronic brake controller mounted within the cab of tow vehicle 6. Additionally, braking systems 1 and 100 are operated via an air spring, which air spring is mounted to overcome a coil spring bias and which is controlled via a control valve 88. Still further, braking systems 1 and 100 provide break away safety defaults which operate should the trailer decouple from the tow vehicle.

Accordingly, the improved trailer braking system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved trailer braking system is constructed and used, the characteristics of the construction, and the advantageous, new and useful results obtained; the new and useful structures, devices, elements, arrangements, parts and combinations, are set forth in the appended claims.

I claim:

1. A trailer braking system for use with a trailer vehicle having a frame, the trailer vehicle pulled by a tow vehicle, the trailer braking system comprising:

a brake cylinder adapted to be carried by the trailer, the brake cylinder having a brake cylinder coil spring disposed therein;

an actuator rod operatively engaging the brake cylinder;

a hydraulically actuated brake shoe adapted to be mounted on at least one wheel;

a hydraulic brake line extending between the hydraulic brake and the hydraulically actuated brake shoe;

spring means positioned outside of the brake cylinder for applying a first force for moving the actuator rod relative to the brake cylinder;

actuator means for applying a second force to overcome the spring means and for moving the actuator rod in a direction opposite the direction of movement of the actuator rod as a result of the movement caused by the spring means whereby the first force is applied in a direction substantially opposite to the direction of the second force, the actuator means being one of an air bladder and a linear actuator operatively mounted mechanically between the actuator rod and the frame; and electric control means for controlling the actuator means from the tow vehicle whereby the electric control means controls the actuator means to move the actuator rod toward the brake cylinder and for increasing the hydraulic pressure within the hydraulic line and for applying the hydraulic brakes carried by the trailer.

2. A trailer braking system as defined in claim 1 in which a fluid reservoir is attached to one of the air bladder linear actuator.

3. A trailer braking system as defined in claim 2 in which the electric control means includes an electronic operator adapted to be carried by the tow vehicle and a control system electronically connected to the electronic operator and adapted to be carried by the trailer frame.

4. A trailer braking system as defined in claim 3 in which the control system includes an electromagnet adapted to be carried by the trailer whereby the electronic operator creates an output signal which is forwarded to the electromagnet.

5. A trailer braking system as defined in claim 4 in which a control system lever is movably attached to the frame; in which a portion of the lever is positioned adjacent the electromagnet whereby activation of the electromagnet causes the control system lever to move relative to the frame.

6. A trailer braking system as defined in claim 1 in which an actuator lever is adapted to be mounted to the frame; in which the actuator rod is mounted to the actuator lever; in which the spring means moves the actuator lever and interconnected actuator rod relative to the brake cylinder; and in which one of the air spring and linear actuator is mounted intermediate the trailer frame and the lever.

7. A trailer braking system as defined in claim 6 in which the spring means is a coil spring.

8. A trailer braking system as defined in claim 1 further comprising break-away means for moving the actuator rod toward the brake cylinder and applying the trailer brakes when the tow vehicle decouples from the trailer vehicle.

9. A trailer braking system as defined in claim 8 in which the breakaway means includes emergency vent means for venting air from the air spring and permitting the coil spring to expand and actuate the trailer brakes when the tow vehicle decouples from the trailer vehicle.

10. A trailer braking system for use with a trailer vehicle having a frame, the trailer vehicle pulled by a tow vehicle, the trailer braking system comprising:

a brake cylinder adapted to be carried by the trailer, the brake cylinder having a brake cylinder coil spring disposed therein;

an actuator rod operatively engaging the brake cylinder;

a hydraulically actuated brake shoe adapted to be mounted on at least one wheel;

a hydraulic brake line extending between the hydraulic brake and the hydraulically actuated brake shoe;

spring means positioned outside of the brake cylinder for applying a first force for moving the actuator rod relative to the brake cylinder;

actuator means for overcoming the spring means and for moving the actuator rod in a direction opposite the direction of movement of the actuator rod as a result of the movement caused by the spring means, said actuator means being one of an air spring and a linear actuator operatively mounted mechanically between the actuator rod and the frame;

electric control means for controlling the actuator means from the tow vehicle whereby the electric control means controls the actuator means to move the actuator rod toward the brake cylinder and for increasing the hydraulic pressure within the hydraulic line and for applying the hydraulic brakes carried by the trailer, the electric control means including an electronic operator adapted to be carried by the tow vehicle and a control system electronically connected to the electronic operator and adapted to be carried by the trailer frame;

the control system further including an electromagnet adapted to be carried by the trailer whereby the electronic operator creates an output signal which is forwarded to the electromagnet;

a control system lever being movably attached to the frame wherein a portion of the lever is positioned adjacent the electromagnet whereby activation of the electromagnet causes the control system lever to move relative to the frame;

the control system further including an energized stop; in which a feedback cylinder is positioned adjacent the control system lever; in which the feedback cylinder is operatively connected to the brake cylinder whereby hydraulic force within the brake cylinder is transmitted to the control cylinder; and in which the control cylinder moves the control system lever out of contact with the energized stop upon receiving a predetermined pressure from the brake cylinder; and a fluid reservoir being attached to the actuator means.

11. A trailer braking system as defined in claim 10 in which the control system includes a valve operatively connected to the actuator means and the fluid reservoir for controlling the flow of fluid to the actuator means whereby movement of the control system lever forward and away from the energized stop operates the valve.

12. A trailer braking system as defined in claim 11 in which the valve is a three-way cylinder valve.

13. A trailer braking system as defined in claim 11 in which the fluid reservoir is an air reservoir tank; and in which the actuator means is an air spring whereby expansion of the air spring compresses the coil spring and moves the actuator rod toward the brake cylinder.

14. A trailer braking system as defined in claim 11 in which the fluid reservoir is an air reservoir tank; and in which the actuator means is an air spring whereby compression of the air spring permits the coil spring to expand and move the actuator rod toward the brake cylinder.

15. A method of applying trailer brakes on a trailer vehicle pulled by a tow vehicle comprising the steps of:

operating an electronic control from within the tow vehicle to generate an electronic signal;

forwarding an electronic signal to an electromagnet;

energizing the electromagnet to move a control system lever toward an energized stop;

forwarding a signal to a valve to vary the volume of fluid within an actuator means as a result of the control system lever movement; and varying the length of the actuator means to move an actuator lever toward a brake cylinder.

16. The method as defined in claim 15 in which the step of varying the length of the actuator means includes expanding the actuator means.

17. The method as defined in claim 15 in which the step of varying the length of the actuator means includes contracting the actuator means.

18. The method as defined in claim 15 comprising the further steps of sensing the pressure in the brake lines of the trailer; forwarding the pressure to a feedback control cylinder; and moving the control system lever away from the energized stop upon said brake lines reaching the predetermined pressure.

19. The method as defined in claim 15 comprising the further steps of venting air from the air spring upon decoupling of the tow vehicle from the trailer vehicle.

20. The method as defined in claim 15 comprising the further steps of pulling the actuator lever toward the brake cylinder upon decoupling of the tow vehicle from the trailer vehicle; and latching the lever in the pulled position to assure that the trailer brakes remain engaged after decoupling.

21. A trailer braking system for use with a trailer vehicle having a frame, the trailer vehicle pulled by a tow vehicle, the trailer braking system comprising:

a brake cylinder adapted to be carried by the trailer, the brake cylinder having a brake cylinder coil spring disposed therein;

an actuator rod operatively engaging the brake cylinder;

a hydraulically actuated brake shoe adapted to be mounted on at least one wheel;

a hydraulic brake line extending between the hydraulic brake and the hydraulically actuated brake shoe;

spring means positioned outside of the brake cylinder for applying a first force for moving the actuator rod relative to the brake cylinder, the spring means being a coil spring;

actuator means for overcoming the spring means and for moving the actuator rod in a direction opposite the direction of movement of the actuator rod as a result of the movement caused by the spring means, said actuator means being one of an air spring and a linear actuator operatively mounted mechanically between the actuator rod and the frame;

electric control means for controlling the actuator means from the tow vehicle whereby the electric control means controls the actuator means to move the actuator rod toward the brake cylinder and for increasing the hydraulic pressure within the hydraulic line and for applying the hydraulic brakes carried by the trailer;

an actuator lever being adapted to be mounted to the frame, the actuator rod being mounted to the actuator lever, the spring means moving the actuator lever and interconnected actuator rod relative to the brake cylinder, and in which the actuator means is mounted intermediate the frame and the actuator lever; and the actuator rod including an outwardly extending flange, and in which the coil spring is mounted intermediate the trailerframe and the outwardly extending flange.

22. A trailer braking system for use with a trailer vehicle having a frame, the trailer vehicle pulled by a tow vehicle, the trailer braking system comprising:

a brake cylinder adapted to be carried by the trailer, the brake cylinder having a brake cylinder coil spring disposed therein;

an actuator rod operatively engaging the brake cylinder;

a hydraulically actuated brake shoe adapted to be mounted on at least one wheel;

a hydraulic brake line extending between the hydraulic brake and the hydraulically actuated brake shoe;

spring means positioned outside of the brake cylinder for applying a first force for moving the actuator rod relative to the brake cylinder, the spring means being a coil spring;

actuator means for overcoming the spring means and for moving the actuator rod in a direction opposite the direction of movement of the actuator rod as a result of the movement caused by the spring means, said actuator means being one of an air spring and a linear actuator operatively mounted mechanically between the actuator rod and the frame;

electric control means for controlling the actuator means from the tow vehicle whereby the electric control means controls the actuator means to move the actuator rod toward the brake cylinder and for increasing the hydraulic pressure within the hydraulic line and for applying the hydraulic brakes carried by the trailer;

an actuator lever being adapted to be mounted to the frame, the actuator rod being mounted to the actuator lever, the spring means moving the actuator lever and interconnected actuator rod relative to the brake cylinder, and in which the actuator means is mounted intermediate the frame and the actuator lever; and in which the coil spring extends between the actuator lever and the frame.

23. A trailer braking system for use with a trailer vehicle having a frame, the trailer vehicle pulled by a tow vehicle, the trailer braking system comprising:

a brake cylinder adapted to be carried by the trailer, the brake cylinder having a brake cylinder coil spring disposed therein;

an actuator rod operatively engaging the brake cylinder;

a hydraulically actuated brake shoe adapted to be mounted on at least one wheel;

a hydraulic brake line extending between the hydraulic brake and the hydraulically actuated brake shoe;

spring means positioned outside of the brake cylinder for applying a first force for moving the actuator rod relative to the brake cylinder;

actuator means for applying a second force to overcome the spring means and for moving the actuator rod in a direction opposite the direction of movement of the actuator rod as a result of the movement caused by the spring means whereby the first force is applied in a direction substantially opposite to the direction of the second force, the actuator means being one of an air bladder and a linear actuator operatively mounted mechanically between the actuator rod and the frame; and electric control means for controlling the actuator means from the tow vehicle whereby the electric control means controls the actuator means to move the actuator rod toward the brake cylinder and for increasing the hydraulic pressure within the hydraulic line and for applying the hydraulic brakes carried by the trailer break-away means for moving the actuator rod toward the brake cylinder and applying the trailer brakes when the tow vehicle decouples from the trailer vehicle; the break-away means including a safety chain extending between the actuating lever and the tow vehicle; in which a flange extends around the actuator rod; in which a flange catch is mounted to the brake cylinder; in which the flange catch deflects to allow the flange to pass therethrough; and in which the flange catch retains the flange whereby the actuator rod is positioned within the brake cylinder when the tow vehicle decouples from the trailer vehicle.

* * * * *